United States Patent [19]

Bates

[11] 3,754,352

[45] Aug. 28, 1973

[54] DEVICE FOR WATERING TREES AND OTHER PLANTS

[76] Inventor: Gary G. Bates, 9735 Harrison Rd., Romulus, Mich. 48174

[22] Filed: Apr. 24, 1972

[21] Appl. No.: 247,114

[52] U.S. Cl. .................................. 47/48.5, 47/38.1
[51] Int. Cl. ............................................ A01g 29/00
[58] Field of Search...................... 47/48.5, 38, 38.1

[56] References Cited
UNITED STATES PATENTS

| | | | |
|---|---|---|---|
| 419,242 | 1/1890 | Brown.................................. | 47/48.5 |
| 588,278 | 8/1897 | Kling..................................... | 47/48.5 |
| 1,815,676 | 7/1931 | Medveczky............................ | 47/38 |
| 3,067,543 | 12/1962 | Bracey.................................. | 47/38.1 |

FOREIGN PATENTS OR APPLICATIONS

| | | |
|---|---|---|
| 1,231,246 | 9/1960 | France |
| 1,473,290 | 3/1967 | France |
| 1,563,819 | 4/1969 | France |

*Primary Examiner*—Robert E. Bagwill
*Attorney*—Peter L. Kempay

[57] ABSTRACT

A device for the controlled watering of trees and plants. The device includes a sealed reservoir holding a supply of water, a chamber which has porous walls in contact with the soil surrounding the roots of the tree or plant, a supply pipe connecting the chamber to the reservoir and an air pipe extending from the chamber to the atmosphere. The supply pipe is located so that water flows into the chamber from the reservoir only when the water level within the chamber drops below the lower end of the supply pipe so that only a controlled amount of water is permitted to enter the soil around the roots of the tree or plant.

12 Claims, 11 Drawing Figures

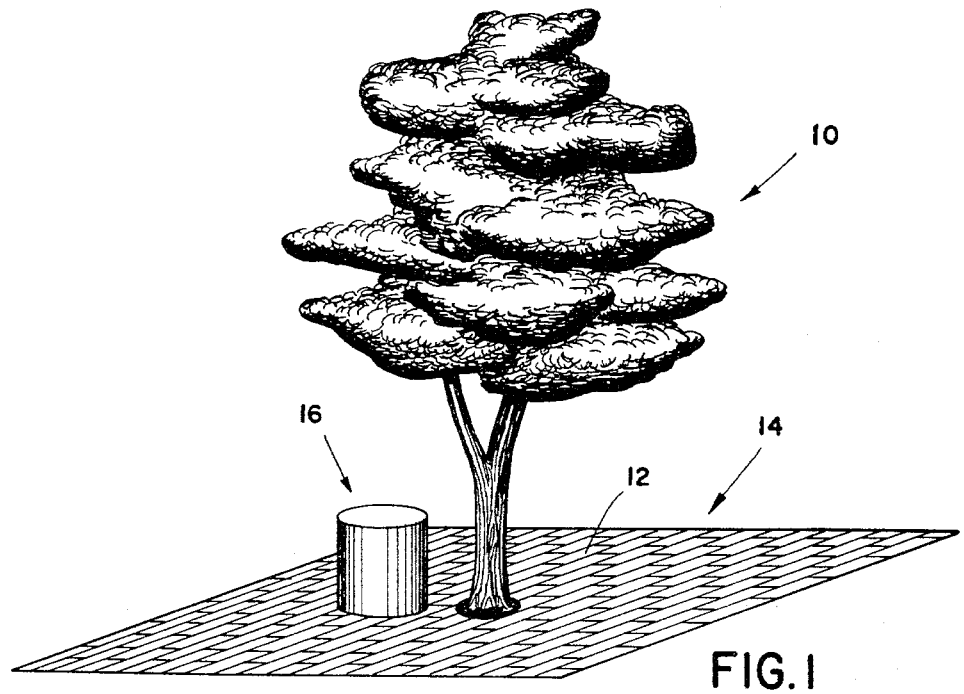
FIG.1
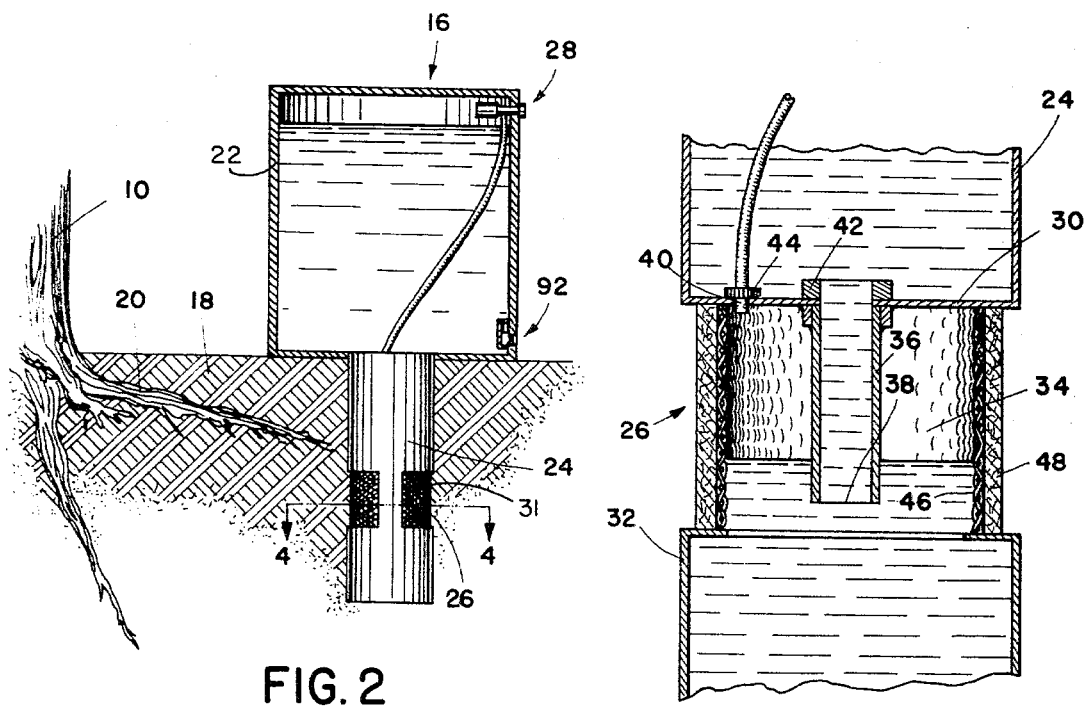
FIG.2
FIG.3

Patented Aug. 28, 1973 3,754,352

DEVICE FOR WATERING TREES AND OTHER PLANTS

This application relates to a device for watering trees and other plants and more particularly to such a device for watering trees or plants in restricted environments such as planters, containers, and openings in paved areas.

When trees or other plants are located in restricted areas, such as containers, openings in sidewalks, and the like, it is not possible to rely solely on rain water to maintain the plants in a healthy condition since there is insufficient soil exposed to rain to provide adequate water for the plants. Also, it may be undesirable to permit surface water to reach the roots of the plants, especially where the trees or the plants are located in sidewalks or along streets since salt and other chemicals from the sidewalks and roadways may accumulate in the soil, adversely effecting the trees and plants. The small amount of surface through which water can reach the roots of the plants makes it necessary to provide frequent waterings. This, however, may be prohibitively expensive especially where there are a large number of plantings. Frequently, watering of plants is accomplished by merely flooding the area around the plant. This, however, is injurious to the health of the plant.

It is the primary object of the present invention to provide a device which provides water to plants located in restricted areas in a manner most advantageous to the plant.

It is also an object of the present invention to provide a plant watering device which maintains a large reservoir of water, eliminating the need for frequent watering of the plant.

It is a further object of the invention to provide such a device which automatically releases water to the soil surrounding the plant roots in a manner such as the soil remains moist but not saturated.

Another object of the invention is to provide a plant watering device having water storage capacity which may be of an attractive appearance, blending with or complimenting the surroundings.

The above and other objects of the invention which will become apparent in the following detailed description are achieved by providing a plant watering device which consists, essentially, of a closed reservoir, a chamber having porous walls communicating with the soil surrounding the roots of the plant, a supply pipe extending from the chamber to the reservoir, and an air line extending from the chamber to the atmosphere with the supply pipe and air line being located so that water flows into the chamber from the reservoir only when the water level within the chamber drops below a preselected level.

For a more complete understanding of the invention and the objects and advantages thereof reference should be had to the following detailed description and the accompanying drawings wherein there is shown a preferred embodiment of the invention.

In the drawing:

FIG. 1 is a pictorial view of a tree planting utilizing the watering device of the present invention;

FIG. 2 is a vertical sectional view of the watering device of FIG. 1;

FIG. 3 is a fragmentary sectional view, on an enlarged scale, of a portion of the device of FIG. 2, showing the construction of the chamber from which water is permitted to enter the soil;

Figure 4:
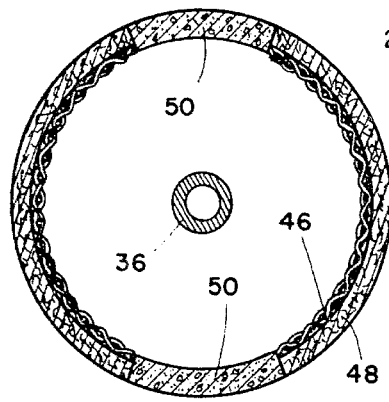
FIG. 4 is a horizontal sectional view taken along the line 4—4 of FIG. 2.

A tree planted in a typical urban environment is shown in FIG. 1. The tree 10 is planted in an opening 12 in a paved area 14, for example a sidewalk or plaza. The small surface area of the opening 12 and the fact that the soil in this area is likely to be highly compacted, severely limit the amount of surface water which can enter the soil around the roots of the tree 10. Frequently, this small amount of surface water which reaches the roots of the tree is totally inadequate to support the tree. Heretofore, the principal method of watering plants in such locations has been to provide an open ended tile or pipe extending downwardly from the surface of the soil 12 so that water may be introduced into the soil around the roots of the tree. However, this method frequently results in flooding of the soil around the tree roots to the extent that the tree is overwatered. In order to prevent the alternate under- and overwatering of the tree or other planting the present invention provides a device 16 which, as will be discussed in greater detail below, controllably releases water to the soil around the tree roots to maintain the soil in a moist but non-saturated condition which is ideal for growth of the tree.

As will be seen from FIGS. 2–4, the watering device 16 of the present invention includes a water storage tank 22. This storage tank 22, which may be constructed of steel, waterproof concrete, fiberglass, or other suitable material, is a sealed tank. The tank 22 has a lower extension 24 which projects into the soil 18 adjacent the tree roots 20. The lower extension 24 of the tank 22 communicates with a chamber 26 which has porous side walls 31.

The construction of the chamber 26 is shown in greater detail in FIGS. 3 and 4. The bottom wall 30 of the extension 24 of the tank 22 defines the top wall of the chamber 26 while a base 32 defines the bottom wall of the chamber 26. The base 32 is joined to the bottom wall 30 of the tank extension 24 by vertical members 50, large sized openings being provided in the sides of the chamber 26. These large openings are covered with porous material 48 such as fiberglass batting. In order to support the porous material 48 and prevent its being pressed inwardly by the soil 18, wire screening 46 may be provided on the inner sides of the openings.

A supply pipe 36 extends from an opening 42 in the lower wall 30 of the tank extension 24 to a point 38 closely adjacent the lower end of the chamber 26. This pipe 36 may be pipe length secured to the tank or a downwardly projecting portion of the tank. An air supply pipe 40 also communicates with the chamber 26, the pipe extending through an opening 44 in the lower wall 30 of the tank extension 24. The opposite end of the pipe 40 is open to the atmosphere. While the pipe or air line 40 is shown extending through the tank 24, it will be apparent that the air line may be located externally of the tank.

Figure 5:
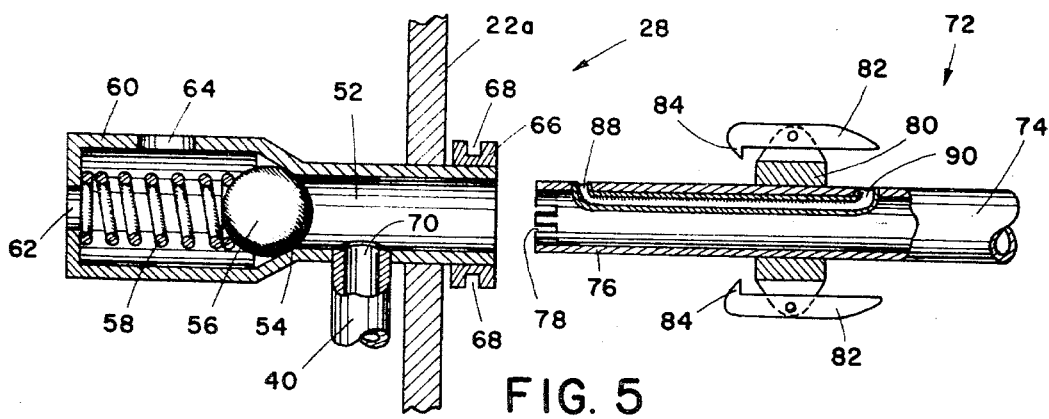
FIG. 5 is a transverse sectional view, on an enlarged scale, of one form of valve which may be used with the device of FIGS. 2–4.

The tank 22 is provided with a filling valve 28, one version of which is illustrated at FIG. 5 and described in greater detail below. This valve is so constructed that the interior of the tank 22 is open to the atmosphere only when water is being supplied to the tank. At all other times, the only path by which air can enter the tank 22 is via the line 40 through the chamber 26 and the supply pipe 36. As a result, water can pass from the tank 22 to the chamber 26 only when the water level within the chamber 26 is below the point 38 at the lower end of the supply pipe 36. This assures that only a controlled quantity of water will be present in the chamber 26. Capillary action within the fibrous material 48 carries the water within the chamber 26 upwardly so that a large surface area of soil is in contact with the water. Since the chamber 26 is at atmospheric pressure the water within the chamber is not forced into the surrounding soil 18 but passes into the soil merely by capillary action through the porous material 48. As a result, the soil around the tree roots 20 is moist but not saturated. As additional water is absorbed by the soil, the water level within the chamber 26 will drop until the lower end of the supply pipe 36 is uncovered. Air may now pass upwardly through the supply pipe 36 into the closed water storage tank 22 permitting the water to flow into the chamber 26 until the lower end of the supply pipe is again covered.

The chamber 26 also serves as an auxiliary reservoir to hold excess water which may be present in the soil surrounding the plant roots following a rain, for example. Thus, if the soil 18 becomes overly wet following a rain, the water level in the soil 18 will rise above the level at which water is maintained in the chamber 26. This excess water will then flow inwardly through the porous walls 48 filling the chamber to a level above the point 38 where the excess water is stored until the soil has dried sufficiently to reabsorb water from the chamber 26. Thus, excessive flooding of the tree roots is reduced.

The filling valve 28 used with the watering device of FIG. 1 is illustrated in FIG. 5. A short pipe length 52 projects through the wall 22a of the tank 22 and has an enlarged inner end 54 providing a seat for a ball 56. A coil spring 58 carried by a cage 60 biases the ball against the seat 54 so that a tight seal is maintained at the end of the pipe length 52. The cage 60 is provided with openings 62 and 64 communicating with the interior of the tank 22. The outer end of the pipe length 52 is provided with a collar 66 having a pair of notches 68 at diametrically opposed points on its outer circumference. The air line 40 extending upwardly from the chamber 26 opens into the pipe length 52 at an opening 70 so that the tube 40 is normally in direct communication with the atmosphere through the pipe 52.

The valve 28 co-operates with a filling nozzle 72. This nozzle is formed of a tubing length 74 connected to any suitable water supply and having its inner end 76 provided with notches 78 through the side wall of the tubing length 74. The tubing length 74 is slideably received within the tube 52 of the valve and the inner end 76 of the tube contacts the ball 56 forcing it away from the seat 54. In order to retain the nozzle in position while filling the tank a collar 80 is provided on the outside of the tube 74 and a pair of pivotal latching members 82 are provided in diametrically opposite points of the collar 80. The latching members have radially inwardly directed end portions 84 which engage the notches 68 of the collar 66 on the tubing length 52. It will be noted that when the tube 74 is inserted into the tube 52 the wall of the tube 74 closes the opening 70 so that the chamber 26 is temporarily blocked from the atmosphere. In order to provide venting of the tank 22 so that water may be introduced to the tank a vent tube 86 is provided in the nozzle 72, the tube extending from a first opening 88 which, when the nozzle is inserted into the valve is in communication with the interior of the tank 22 and a second opening 90 which communicates with the atmosphere. Obviously, other arrangements for venting the tank during filling such as a groove extending on the outer surface of the tubing length 74 may be employed, if desired.

Figure 6:
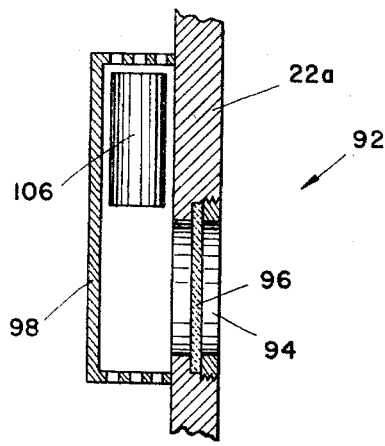
FIG. 6 is a fragmentary sectional view, on an enlarged scale, of the water level indicating means of the device of FIG. 2.

The amount of water used by the tree or plant 10 from the device 16 will vary in accordance with a number of factors including the amount of rainfall, size of the plant, etc. The tank 22 may be of sufficient size to provide an adequate water supply for a substantial period of time. In order to provide an indication that additional water should be added to the tank 22 there may be provided a gauge 92 which is illustrated in greater detail in FIG. 6. An opening 94 is provided in the side wall 22a of the tank 20 and has a transparent window 96. A wire or other cage 98 is provided on the interior of the tank adjacent the window 96 and retains a float 100. Preferably, the float is colored so as to be readily visible when aligned with the window 96. The cage 98 is constructed so that when the water level is above the window 96, the float 100 is not visible but, when the water level drops, the float is retained in front of the window 96. Obviously, other water level indicating means may be used in place of the float arrangement of FIG. 6.

Figure 7:
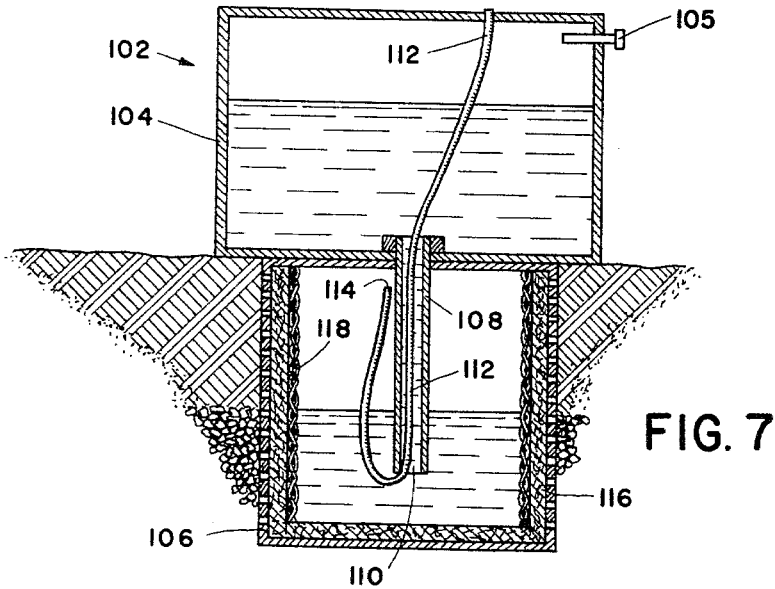
FIG. 7 is a vertical sectional view of a second embodiment of the device of the present invention.

A modification of the tree and plant watering device of the invention is shown in FIG. 7. The watering device 102 of this embodiment again has a closed storage tank 104 provided with a filling valve 105 which may be similar in construction to the valve of the previously described embodiment. A perforated steel basket 106 is positioned below the tank 104 and communicates with the tank by means of a water supply pipe 108 having its lower end 110 adjacent the lower end of the basket 106. An air line 112 which is open at its upper end to the atmosphere extends downwardly through the supply pipe 108 and has its lower end 114 positioned above the normal water level within the perforated basket 106. The inner sides of the basket 106 are lined with the fibrous material 116 which may, for example, be fiberglass batting. Suitable supporting framework such as the wire screen 118 may be provided to hold the fibrous material 116 in place. As with the previously described embodiment, water flows into the porous basket 106 from the storage tank 104 only when the water level within the basket 106 has dropped below the lower end 110 of the supply pipe 108. The porous material carries water upwardly along the sides of the basket 106 by capillary action so that a large area of soil is in contact with the water.

Figure 8:
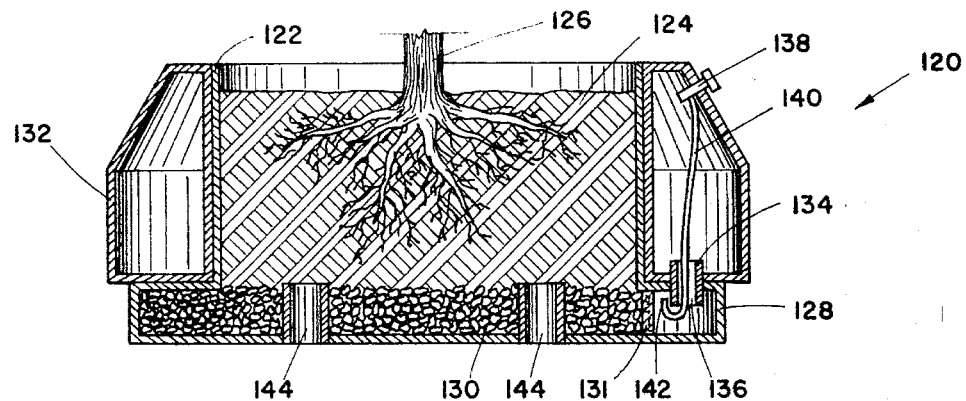
FIG. 8 is a vertical sectional view of another modification of the device.

The watering device 120 of FIG. 8 is designed for use as a free-standing planter. The device includes an open topped planter 122 which is filled with earth for supporting one or more shrubs, trees or other plants. The lower end of the planter 122 has an annularly enlarged portion 128 and is filled with coarse granular material such as gravel, coarse aggregate, styrofoam, or other porous material 130. A closed tank 132 encircles the container 122 above the enlarged base 128. The tank 132 is a sealed tank and communicates with the lower region 128 of the container 122 by means of a supply pipe 134. The lower end of the supply pipe 134 is located closely adjacent the bottom wall of the container 122. A filling valve 138, which may be of the type described above, is provided for filling the tank 132. An air line 140 open at its upper end to the atmosphere extends into the lower portion of the planter 122, the air supply line having its lower end 142 above the normal water level as determined by the lower end of the supply pipe 134. The supply pipe 134 and the lower end of the air line 140 are surrounded by an open-ended porous cylinder 131 to provide a region surrounding the pipes which is free of gravel or other aggregate.

The device 120 operates in the same manner as the previously described embodiments. As long as the water level within the lower portion 128 of the container 122 is above the lower end 136 of the supply pipe 134 no air can enter the tank 132 and, as a result, no water passes through the supply pipe 134 to the container 122. When, however, the water level drops below the lower end of the supply pipe 134 air enters the tank 132 through the supply pipe 134 permitting water to flow into the lower portion 128 of the container. The gravel or other material 130 on the lower portion of the container 122 permits the water to flow across the entire bottom of the container so that a large surface area of the soil is exposed to the water and, by capillary action, the water is drawn upwardly to the roots of the plants 126. In order to prevent saturation of the soil 124 in the container 122 which may result from the addition of surface water into the container 122 as a result of rain, drain pipes 144 are provided through the bottom wall of the container 122, the drain pipes having their upper ends located above the normal water level as determined by the lower end 136 of the supply pipe 134. When additional water beyond that normally maintained in the bottom of the container 122 is present, this water will flow outwardly through the pipes 144 so that saturation of the soil does not occur.

Figure 9:
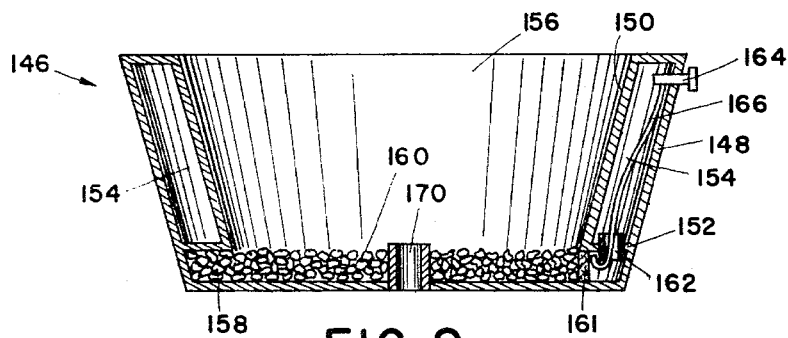
FIG. 9 is a vertical sectional view of a fourth embodiment of the plant and tree watering device of the present invention.

FIG. 9 illustrates a modification of my device which is similar in construction to that of FIG. 8 but in which the tank assembly is incorporated directly into the planter. The device 146 includes a container shell 148 which is provided with a second inner wall 150 located concentrically within the side walls of the container and connected thereto by top and bottom walls 152 to form an annular tank 154 surrounding the plant receiving area 156 of the container. The inner walls 150 do not extend the full depth of the container and leave an enlarged lower area 158 which is filled with gravel or other porous material 160. A water supply pipe 162 extends through the lower wall 152 of the tank communicating with the lower region 158 of the container. The tank is provided with a filling valve arrangement 164 which may be similar to the valves described above and with an air line 166 connected at its upper end to the atmosphere and extending downwardly into the lower region 160, terminating at a point 168 above the upper end of the water supply pipe 162. An open-ended porous cylinder 161 surrounds the water supply pipe 162 and the lower end of the air line 166. The container may be provided with an overflow pipe 170 to prevent saturation of the soil.

Figure 10:
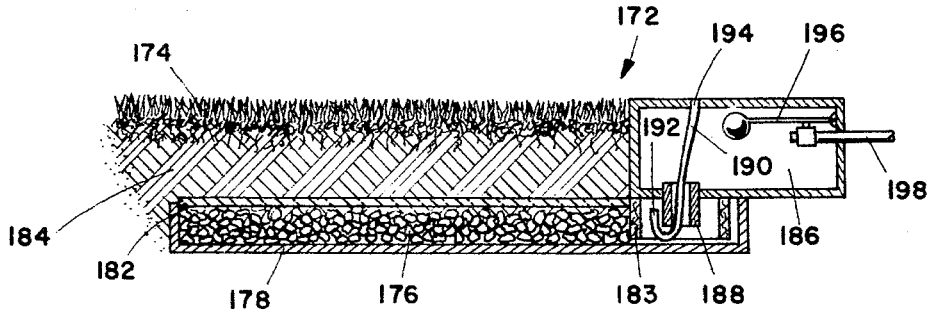
FIG. 10 is a vertical sectional view of a further modification of the invention adapted for watering large areas such as golf greens.

A further modification of the invention adapted for watering large areas such as golf greens is shown in FIG. 10. This device 172 provides for the watering of an area of grass 174 from below the surface of the soil. This is a preferable arrangement compared to the conventional method of watering by sprinkling or flooding the area since, when the grass is watered from the surface, a shallow root system normally develops whereas when the water is supplied from beneath the surface the grass roots extend deeper into the soil, providing for more healthy sod. A water transfer region 176 equivalent to the chambers of the previously described embodiments is formed by excavating the area which is to be watered to form a pit 178. Plastic sheeting or other water imprevious means 180 are applied to the bottom and side walls of the lower end of the pit which is then filled with gravel or other porous material and covered with a porous covering 182 such as fiberglass batting. A layer of soil 184 covers the transfer region 176. A sealed tank 186 is provided and has a water supply pipe 188 extending through its bottom wall and communicating with the transfer region 176. An air supply line 190 extends from a point within a transfer region 192 which is above the lower end of the water supply pipe 188. A gravel free region surrounding the pipes 188 and 190 is provided by the open-ended porous or sleeve 183. The opposite end 194 of the air supply line 190 is open to the atmosphere. The tank 186 may be provided with a filling valve arrangement similar to those described above or may employ a float valve arrangement 196 connected to a water line 198 so that an adequate water supply is maintained within the tank 186 at all times.

The transfer region 176 receives water from the tank 186 whenever the water level drops below the lower end of the supply pipe 188. By capillary action, the water within the transfer region 176 passes upwardly through the porous material and fiberglass batting or other covering 182 into the soil 184 to maintain the soil in a moist state and, thus, providing adequate moisture for the ground covering 174.

Figure 11:
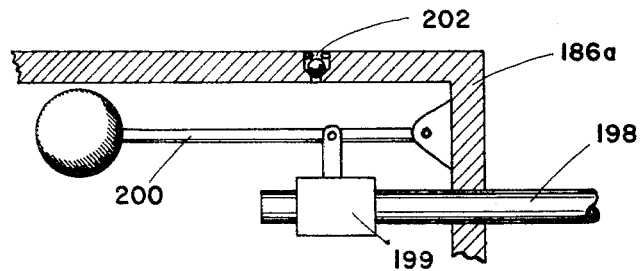
FIG. 11 is a fragmentary sectional view, on an enlarged scale, of the valve means utilized with the device of FIG. 10.

The float valve 196 is illustrated in greater detail in FIG. 11 and consists of a valve 199 which is connected to the water line 198 and controlled by a float 200 which may, for example, be pivotally mounted to the side wall 186a of the tank 186. The float valve 199 operates in the conventional manner, the valve being open whenever the float drops below a preselected level and remaining open until the water level within the tank 186 has risen sufficiently to move the float to an upper preselected level closing the valve 199. With this arrangement a constant supply of water is available to the device. A check valve 202 located in the top wall of the tank is provided to permit explusion of air from the tank 186 during the filling thereof. This valve 202 is closed at all times except during filling of the tank. Obviously, this float valve arrangement may be used in place of the manual filling valves of the previously described embodiments.

In addition to providing for the adequate watering of trees or other plants, the devices of the present invention may also serve to distribute fertilizer to the plants. This can be accomplished by adding a controlled amount of soluable fertilizer to the water within the supply tank of the watering device so that the fertilizer is transferred with the water to the soil.

An added advantage of the watering device of the present invention results from the fact that a pocket of fresh air is maintained in the lower chamber along with the water. This provides an oxygen supply which is also dispensed into the soil surrounding the plant roots.

It will be understood that while only the best known embodiments of the invention have been illustrated and described in detail herein, the invention is not limited thereto or thereby but rather may be subject to modifications and/or additions. Reference should therefore be had to the appended claims in determining the true scope of the invention.

What is claimed is:

1. A device for watering a plant which has a root system embedded in the earth, comprising:
   a closed container having top, side and bottom walls;
   valve means extending through a wall of the container adjacent the upper end thereof and adapted to be connected to a source of water, the valve means including means to vent air from the container during the filling thereof;
   a chamber having top, side and bottom walls, the chamber extending below the container and adapted to be located in the earth adjacent the roots of the plant, at least one wall of the container having an opening the outer side of which is exposed to the earth;
   a porous material covering for the opening of the chamber wall;
   a supply pipe extending through the bottom wall of the container into the chamber, the upper end of the supply pipe opening into the lower end of the container, the lower end of the supply pipe opening into the chamber at a point intermediate the upper and lower ends of the opening in the chamber wall; and
   an air line open at one end to the atmosphere at a point above the level of the earth surrounding the plant and at its lower end to the interior of the chamber at a point intermediate the lower end of the supply pipe and the top wall of the chamber.

2. The device according to claim 1 wherein the valve means comprises a normally closed check valve mounted on a wall of the container and a nozzle adapted to enter and open the check valve, the nozzle including the means for venting and being connected to a source of water.

3. The device according to claim 1 wherein the porous material comprises fiberglass batting, support members being provided to retain the batting in the opening.

4. The device according to claim 1 wherein the air line extends upwardly through the container, the upper end of the air line being connected to the valve means, the valve means further including means normally connecting the air line to the atmosphere and operative to close the air line during filling of the container.

5. A device for watering a plant which has a root system embedded in the earth, comprising:
   a closed container having top, side, and bottom walls;
   valve means extending through a wall of the container adjacent the upper end thereof and adapted to be connected to a source of water, the valve means including means to vent air from the container during the filling thereof;
   a chamber connected to and extending downwardly from the bottom wall of the container, the chamber being adapted to be positioned in the earth adjacent the roots of the plant and having a plurality of openings in the side walls thereof;
   a porous material lining the side walls of the container and covering the openings therein;
   a pipe extending vertically downwardly from the bottom wall of the container into the chamber, the upper end of the pipe opening into the lower end of the container and the lower end of the pipe opening into the chamber at a point intermediate the top and bottom walls thereof and not lower than the lowest of the openings in the side wall of the chamber and
   an air line open at its upper end to the atmosphere at a point above the level of the earth surrounding the plant, the air line extending into the chamber and terminating at a point intermediate the lower end of the pipe and the top wall of the chamber.

6. The device according to claim 5 wherein the air line extends upwardly through the pipe and the container, the upper end of the air line extending through the top wall of the container.

7. The device according to claim 5 wherein the chamber comprises a steel basket having perforated side walls.

8. The device according to claim 7 wherein the porous material is fiberglass and further including a wire screen supporting the fiberglass.

9. A device for supplying moisture to the roots of plants embedded in the earth, comprising:
   a fluid impervious member having bottom and side walls and adapted to be positioned within the earth beneath the plants;
   a mass of coarse aggregate substantially filling the region defined by the bottom and side walls of the fluid impervious member;
   a closed container having top, side and bottom walls and adapted to be positioned above the upper level of the coarse aggregate;
   means for filling the container with water;
   an open-ended supply pipe extending downwardly from the bottom wall of the container into the region defined by the fluid impervious member, the upper end of the pipe communicating with the interior of the container, the lower end of the pipe terminating at a point intermediate the bottom wall of the fluid impervious member and the top surface of the mass of coarse aggregate;
   a porous sleeve surrounding the lower end of the supply pipe, the region bounded by the sleeve being free of aggregate; and
   an air line open at its upper end to the atmosphere at a point above the level of the earth surrounding the roots of the plants, the air line extending into the region within the porous sleeve with the lower opening of the air line positioned at a point intermediate the lower end of the supply pipe and the upper level of the aggregate.

10. The device according to claim 9 wherein a layer of fiberglass batting is provided on the upper surface of the mass of aggregate.

11. The device according to claim 9 wherein the fluid impervious member comprises plastic sheeting.

12. The device according to claim 9 wherein the means for filling the container comprises a float operated valve positioned within the container and adjacent the upper end thereof, a water line connected to the valve, and a check valve in the top wall of the container, the check valve being operative to vent air from the container during the filling thereof with water.

* * * * *